United States Patent [19]

McMahon

[11] 4,007,436

[45] Feb. 8, 1977

[54] SELF-DEPLOYING INSTRUMENT ASSEMBLY

[75] Inventor: Garfield W. McMahon, Dartmouth, Canada

[73] Assignee: Her Majesty the Queen in right of Canada as represented by the Minister of National Defense, Ottawa, Canada

[22] Filed: July 7, 1975

[21] Appl. No.: 593,232

[52] U.S. Cl. .................................. 340/8 S; 340/9; 343/880

[51] Int. Cl.² .......................................... H04B 13/00

[58] Field of Search .................. 340/2, 3 T, 8, 8 S, 340/9, 10, 11, 12 R, 13 R, 14, 7; 343/880, 881, 882, 915; 9/8 R; 43/11, 12, 42.74; 211/178 R, 178 A; 181/110, 111, 112

[56] References Cited

UNITED STATES PATENTS

| | | | |
|---|---|---|---|
| 2,652,656 | 9/1953 | Glasser | 43/12 |
| 2,763,002 | 9/1956 | Fitzgerald et al. | 343/915 |
| 3,141,148 | 7/1964 | Hueter | 340/8 S |
| 3,373,434 | 3/1968 | Lorenzo et al. | 343/881 X |
| 3,444,511 | 5/1969 | Morrow | 340/8 S |
| 3,539,979 | 11/1970 | Crall | 340/8 S |
| 3,576,566 | 4/1971 | Cover, Jr. | 343/881 |
| 3,665,381 | 5/1972 | Bauer | 340/8 |
| 3,711,821 | 1/1973 | Dale | 340/8 S |
| 3,803,540 | 4/1974 | Mar | 340/8 S |
| 3,864,772 | 2/1975 | Gogolick et al. | 9/8 R |

*Primary Examiner*—Harold Tudor
*Attorney, Agent, or Firm*—Laff, Whitesel & Rockman

[57] ABSTRACT

A self-deploying instrument assembly includes a plurality of instruments for example hydrophones, mounted on a flexible sheet. A series of resilient rods extend from one side of the sheet from positions spaced around the periphery thereof to a hub. The resilient rods are deflectable laterally inwardly with consequent folding of the sheet to place the assembly in a storable configuration smaller than its normal operative configuration. A suitable container for storing the instrument assembly is also described.

6 Claims, 2 Drawing Figures

SELF-DEPLOYING INSTRUMENT ASSEMBLY

This invention relates to self-deploying instrument assemblies.

Occasions arise when it is desirable to store and/or transport an instrument assembly in a configuration smaller than the normal operating configuration, and further it is frequently desired that the instrument assembly should be capable of automatically assuming its operating configuration when required.

According to the invention, a self-deploying instrument assembly includes a plurality of instruments mounted on a flexible sheet, with a series of resilient rods extending from one side of the sheet from positions spaced around the periphery of the sheet to a hub. The resilient rods are arranged to be biased laterally outwardly so as to urge the flexible sheet to a straight condition. The instrument assembly can be stored in a container with the resilient rods in a laterally-inwardly deflected condition and with the flexible sheet in a folded condition. On release of the instrument assembly from the container, the resilient rods urge the flexible sheet to its flat condition and thereby correctly position the instruments for use.

One use of the invention is with the hydrophone assembly which is dropped in its stored configuration from a ship and is required to deploy to its operating configuration on reaching its intended depth in the water.

Figure 1:
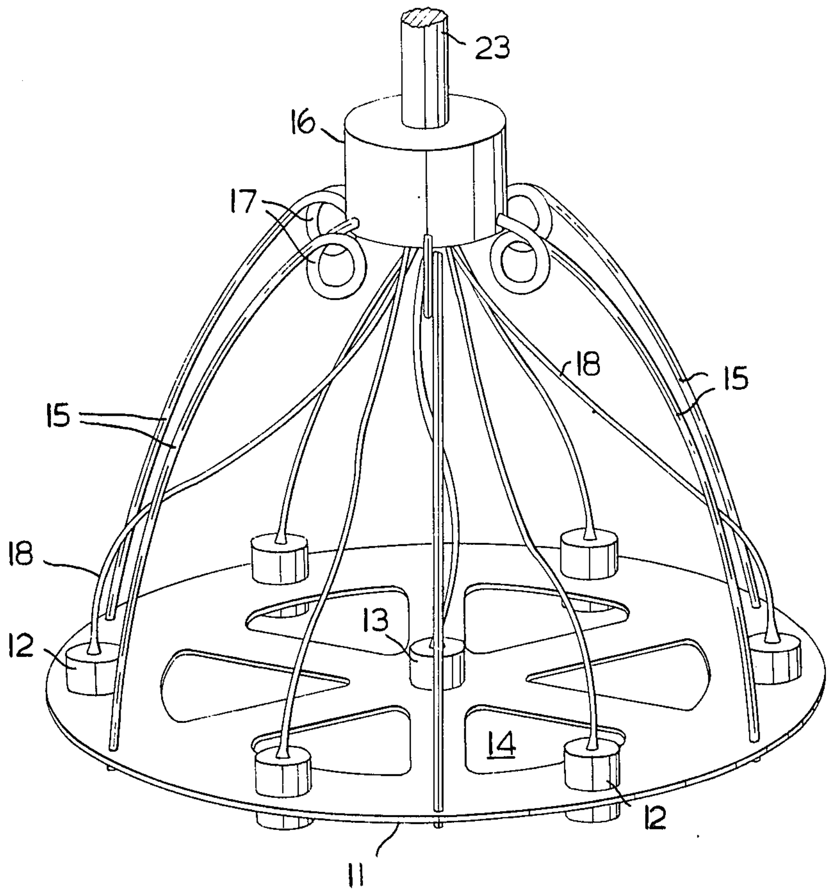
Figure 2:
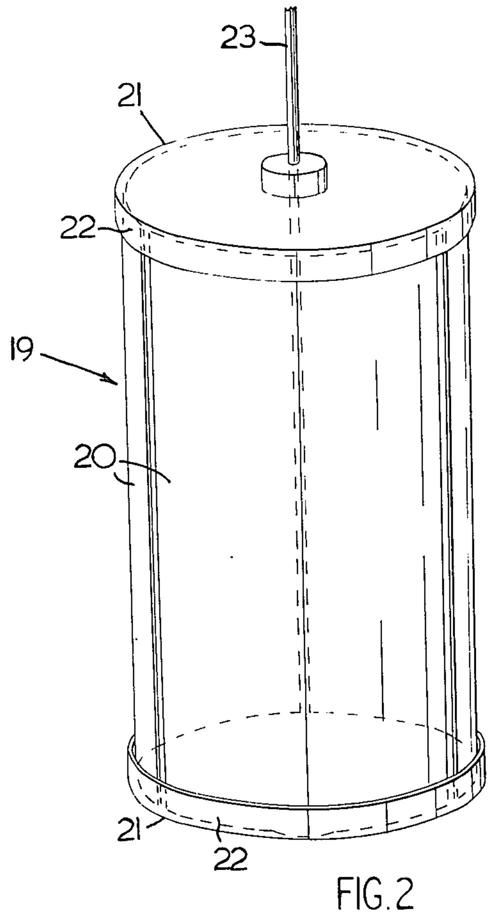

One embodiment of the present invention will now be described, by way of example, with reference to the accompanying drawings, of which:

FIG. 1 is a perspective view of a hydrophone assembly in its operating configuration, and FIG. 2 is a perspective view of the hydrophone assembly of FIG. 1 stored in a container.

Referring to the drawings, a hydrophone assembly includes a circular flexible sheet 11 of elastomeric material such as neoprene rubber or of an elastomeric material reinforced with fabric. A series of hydrophones 12 are secured to the sheet 11 near its edge at circumferentially spaced positions. A further hydrophone 13 is secured to the sheet 11 at its center. Portions of the sheet 11 are cut away, thereby providing apertures 14, so as to reduce the weight and increase the flexibility of the sheet 11.

A series of resilient rods 15 extend from one side of the sheet 11 from circumferentially spaced positions, each rod 15 being located between a pair of hydrophones 12. The rods 15 extend from the sheet 11 to a hub 16. The rods 15 are of course suitably secured to the flexible sheet 11 and to the hub 16. To increase their resiliency, the rods 15 have a coil turn 17 near the hub 16.

Electric cables 18 extend from the hydrophones 12, 13 to the hub 16, which may contain electrical instrumentation.

FIG. 1 shows the hydrophone assembly in its fully deployed configuration, and FIG. 2 shows the hydrophone assembly stored in a container 19. The container 19 has a longitudinally-split body formed from three separate segments 20, which are normally retained in position by end caps 21 which have axially extending rims 22 around the segments 20. The hydrophone assembly is stored within the container 19 in a configuration in which the flexible sheet 11 is suitably folded and the resilient rods 15 are deflected laterally inwardly from their normal positions. In their deflected condition, the rods 15 bear against the inside of the segments 20 to cause the segments 20 to frictionally engage the end caps 21, thereby retaining the container 19 in its assembled condition. The frictional engagement of the caps 21 and segments 20 may be augmented by appropriate relative shaping of these parts.

In the arrangements shown in FIG. 2, the hub 16 is secured to the upper end cap 21, and an electric cable 23 extends upwardly from the hub 16, the cable 23 being provided to transmit signals from the hydrophones 12, 13 to the ship. The described hydrophone assembly, in container 19, is intended to be dropped from a ship into the water and sink to a predetermined depth, at which depth the hydrophone assembly is deployed. The container 19, with the hydrophone assembly therein, is dropped from a ship, with an appropriate length of cable 23 being payed out. When the container 19 reaches the predetermined depth, the cable 23 becomes taut and produces a jerk which removes the upper end cap 21 from the segments 20. The resilient rods 15 then forces the segments 20 out of the lower end cap 21, and the various parts of the container 19 then fall away from the hydrophone assembly. At the same time, the resilient rods 15 spring laterally outwardly until the flexible sheet 11 is unfolded to its straight condition, as shown in FIG. 1. The hydrophone assembly is then ready for operation at the predetermined depth.

The described embodiment is particularly advantageous for use as a hydrophone assembly. Hydrophones 12, 13 are positioned equatorially, and this substantially reduces their response to accelerations, an important consideration for observations at low frequency. The flexible sheet 11 can be of an elastomer which is substantially transparent to acoustic waves in water, particularly with the apertures 14, and it can be seen that the amount of acoustically opaque material, namely the rods 15, is small.

If a magnetic device is required as part of the assembly, the hub 16 and the rods 15 can be made of nonmagnetic material.

The described hydrophone assembly is easy to manufacture and of low cost.

Further, if desired, more than one flexible sheet 11 with hydrophones thereon can be supported by the rods 15, thereby producing a three dimensional array of hydrophones, rather than a two dimensional array as shown.

The embodiments of the invention in which an exclusive property or privilege is claimed are defined as follows:

1. A self-deploying hydrophone assembly including a plurality of hydrophones mounted on a flexible sheet, and a series of resilient rods extending from one side of the sheet from positions spaced around the periphery thereof to a hub for stretching the sheet to an operative position and locating the hydrophones at predetermined spacing, the resilient rods being deflectable laterally inwardly whereby the sheet can be folded, placing the assembly in a storable configuration diametrically smaller than its normal operative configuration.

2. An instrument assembly according to claim 1 wherein the hydrophones and rods are arranged alternately around the periphery of the sheet.

3. An instrument assembly according to claim 2 wherein the sheet is circular.

4. An instrument assembly according to claim 2 wherein the flexible sheet has apertures to reduce the weight of the sheet.

5. An instrument assembly according to claim 1 wherein the rods and hub are of non-magnetic material.

6. A combination of a container and a self-deploying hydrophone assembly, the hydrophone assembly including a plurality of hydrophones mounted on a flexible sheet, and a series of resilient rods extending from one side of the sheet from positions spaced around the periphery thereof to a hub, the container having a longitudinally split body formed by a plurality of separate segments held together by removeable end caps at opposite ends of the segements, the interior width of the body being less than the distance between the opposite rod positions on the sheet, the hydrophone assembly being located within the container with the rods in a laterally-inwardly deflected condition bearing against the interior of the segments, whereby, upon removal of at least one of the end caps the body is forced outwardly by said rods and said assembly deployed.

* * * * *